March 19, 1968     R. K. ERICSON     3,373,855
VOLUTE SPRING CLUTCH DAMPER
Filed May 25, 1965
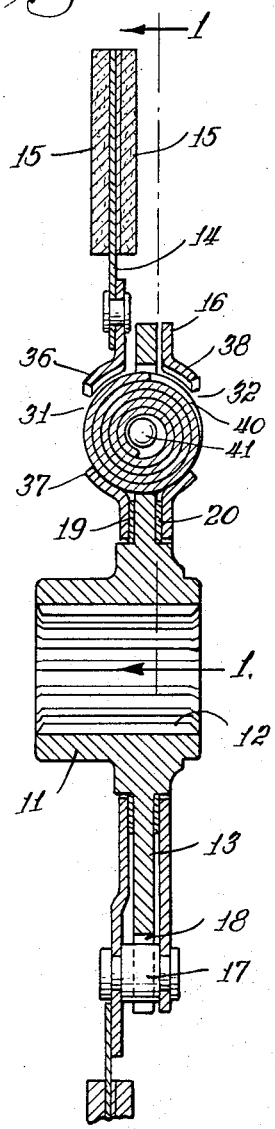
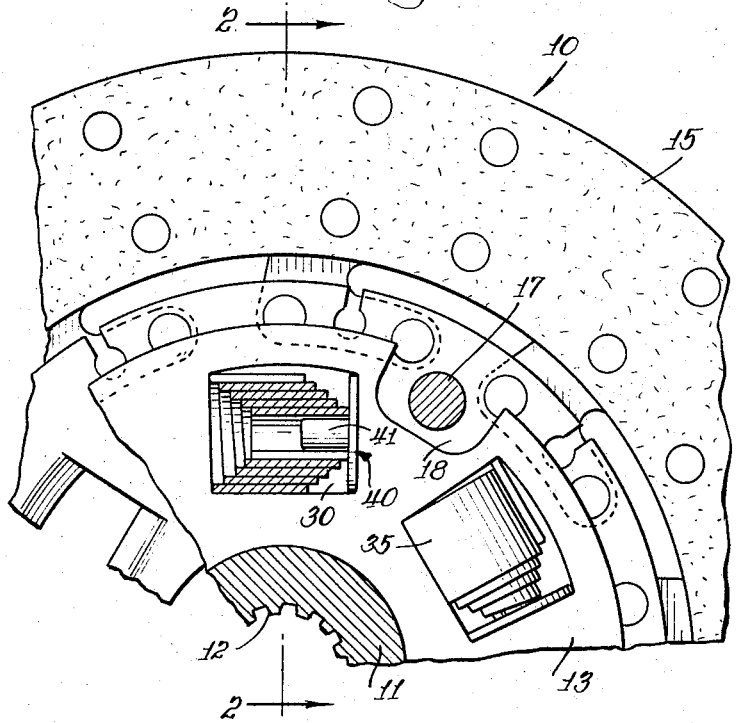
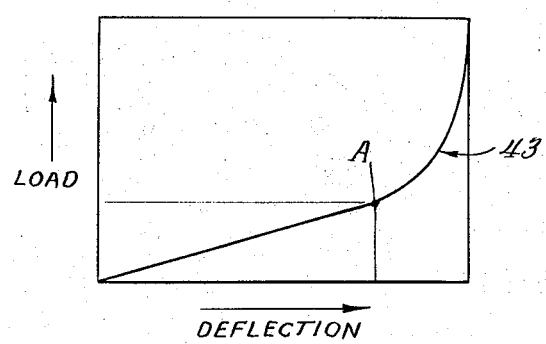
Inventor
Roger K. Ericson
By Robert L. Zieg
Att'y United States Patent Office 3,373,855
Patented Mar. 19, 1968

3,373,855
VOLUTE SPRING CLUTCH DAMPER
Roger K. Ericson, Arlington Heights, Ill., assignor to Borg-Warner Corporation, Chicago, Ill., a corporation of Illinois
Filed May 25, 1965, Ser. No. 458,707
1 Claim. (Cl. 192—107)

ABSTRACT OF THE DISCLOSURE

A clutch device having a hub and an integral annular flange projecting radially from the hub with a friction disc supported on the hub at one side of the flange and a drive washer supported at the other side of the flange. The flange having a plurality of aligned apertures with volute spring means disposed within the apertures and adapted to transmit drive between the flange disc and the hub flange.

---

This invention relates to a structure for transmitting a rotary power drive operable to dampen vibrations and is particularly suited for incorporation as the driven plate member in an automotive vehicle clutch.

It is an object of the present invention to provide for a resilient connection between a driving hub and a clutch plate comprising a plurality of volute springs replacing the known common coil type springs normally used in clutch damper assemblies. Inherent advantages are obtained through use of the volute springs in the vibration damper environment, for example the volute spring is much more compact than the normal spring since, when the spring is compressed, almost all of the available space is taken up by resilient material in the area of the springs. Also the volute springs can be designed so that a certain amount of friction between the coils is encountered and this additional friction may be desirable to assist the friction losses in energy absorption. Also the load deflection characteristics of a volute spring are advantageous since the straight line relationship obtained in normal coil springs is replaced by a load deflection curve which requires increasing load as each of the coils bottoms out under deflection.

Other objects and features of the invention will be readily apparent to those skilled in the art from the specification and the appended drawings illustrating certain preferred embodiments in which:

FIGURE 1 is a partial side elevational view of a clutch-driven member incorporating the principles of the present invention;

FIGURE 2 is a sectional view along the plane of line 2—2 of FIGURE 1; and

FIGURE 3 is a graph illustrating the load and deflection characteristics of the resilient means used in the present invention.

The vibration damper assembly 10 as shown herein comprises a clutch driven member including an inner hub 11 having a central splined opening 12 extending therethrough and carrying an integral annular radially extending flange 13. The clutch further comprises a driven disc 14 having friction facings 15 secured to the opposite sides thereof around the outermost portion of disc 14 and adapted to be packed between driving members in a manner familiar to those skilled in the art. The disc 14 has a central circular opening therethrough by means of which it is seated upon a suitable shoulder provided on the hub 11. On the side of the flange opposite the disc 14 there is an annular drive washer 16. The disc 14 and washer 16 being fixedly connected together in predetermined space relation by the plurality of rivets 17 which extend through suitable notches 18 in the flange 13. The notches 18 have sufficient circumferential extent to permit relative movement between the flange 13 and the subcombination of the disc 14 and the drive washer 16. A pair of friction washers 19 and 20 are also supported on the shoulders on hub 11. Friction washer 19 is mounted in frictional engagement with the flange 13 and the disc 14 and the friction washer 20 is mounted in frictional engagement with the flange 13 and the drive washer 16.

The flange 13 is provided with a plurality of circumferentially space apertures 30. The driven disc 14 is provided with a corresponding plurality of apertures 31 and the drive washer 16 is provided with a corresponding number of apertures 32 of substantially the same radial extent as the apertures 31. The apertures 30 in the hub flange 13 are a larger radial extent than apertures 31 and 32. The apertures 30, 31 and 32 are generally aligned with each other to receive a resilient means comprising a volute spring 35.

In the formation of the aperture 31 in the disc 14 lips 36 and 37 having a generally cylindrical configuration are formed in the edges of the aperture 31 as viewed in FIGURE 2. Likewise in the formation of the apertures 32 in the washer 16 lips 38 and 39 of cylindrical configuration are formed in the proximity of the edges of the aperture 32 as viewed in FIGURE 2. The lips formed in the apertures 31 and 32 serve to generally define a retaining structure of circular cross section which will retain the volute springs 35 within the apertures 30 in the flange 13.

Each of the volute springs 35 has a thrust plate 40 having a pilot pin 41 thereon. The thrust plates are assembled with springs 35 having the pilot pin 41 engaged in the central opening of the volute spring 35. Thus when the spring and thrust member are assembled into the apertures 30 the member 40 provides a surface for contacting the ends of the coils of the volute spring during deflection, and prevents spring 35 from twisting out of position at any time.

As will be apparent from FIGURE 1 the volute springs 35 are formed from flat bar stock and may be formed in the manner illustrated having a varying helix angle of coiling or may be formed with constant helix angle as required by requirement of the drive line and it will be appreciated that the coils are of increasing diameter as viewed in FIGURE 1 beginning with the smallest coil receiving pilot pin 41.

The springs 35 are termed volute springs and could also be defined as spiral springs made from flat bar stock formed in a conical shape. The characteristics of the springs 35 as used in the present invention are such as to make them particularly suitable in a clutch vibration damper assembly.

In FIGURE 3 a typical load deflection curve 43 for volute springs is illustrated in which the amount of deflection of the spring is shown on the horizontal line which increases from left to right and the vertical line represents the load as increasing when moving from the horizontal line upwardly. It will be seen from the graph that a straight line relationship of load deflection is at first obtained until the first coil under deflection bottoms, in other words contacts the flange 13 in the area of apertures 30 as represented by point A on curve 43. After the initial bottoming takes place, increasing amounts of load are required for a given deflection of the spring. Thus as a load beyond the load represented at A is put on the spring, the rate of deflection will decrease for increases in load. This characteristic is particularly suitable in damper assemblies to limit the vibrations which will be developed since the spring becomes increasingly resistant to deflection.

The operation of the arrangement is readily appreciated. Vibrations communicated to disc 14, as for example from the internal combustion engine to which the clutch is coupled, may cause relative movement between the disc 14 (and the washer 16 connected thereto) and the flange 13 by reason of deflection of springs 35, and the deflection in cooperation with the coaction of the friction washers 19 and 20 applying a frictional drag between the subassembly of disc 14 and washer 16 and the flange 13 will minimize vibrations. Driving force from the disc 14 to the hub 11 or vice versa is at all times through the medium of the volute springs 35.

As pointed out above the volute springs provide inherent advantages in the clutch vibration damper assembly. The springs are very compact as compared to a common coil spring since, when they are compressed solid, practically all of the available space in a radial sense is taken up by resilient material. This compactness of the springs provides greater torque capacity for a given angular deflection and size of aperture in the parts of the clutch assembly.

Further, due to the treatment given the volute spring in its manufacture, the load deflection curve can be adjusted. For example, a volute spring can be designed to produce a certain amount of friction between the coils as the spring is deflected. As illustrated in FIGURE 1, for example, adjacent coils are in frictional engagement and resistance to deflection due to the friction developed may be increased by a "tighter" winding of the volute spring. This frictional engagement between adjacent coils may therefore be used to increase the resistance of the spring to deflection and to assist the friction washers in energy absorption.

Further the larger torque capacity possible due to compactness of springs 35 will effectively eliminate torsional vibrations in the drive line of vehicles having engines of substantially greater horsepower output than heretofore possible.

In the manufacture of the spring by means of known technology residual stresses can be induced in the spring to increase the load carrying capacity and increase the fatigue life of the spring. By means of first stress relieving the springs by heat treatment in the manufacturing and then afterward inducing favorable residual stresses of desired magnitude by bending the spring beyond its elastic limit and then allowing it to spring back to a new position and shot peening the spring, for example, residual stresses can be imparted to the volute springs. These residual stresses in the springs will be in opposition to the direction of the stress imparted in loading the spring so that when the spring is deflected the residual stresses must first be cancelled out and then the greater amounts of force applied will begin to stress the spring toward its yield point. In this way the spring can operate at loads above its original endurance limit.

In summary it can be seen that by means of the incorporation of the spiral conical shaped or volute springs 35, there has been provided a unique and improved type of clutch vibration damper assembly. A greater amount of torque capacity or angular deflection can be provided due to the compactness of the spring 35; the load deflection curve of the spring is adjustable in design; certain amounts of friction can be induced between the coils to increase the resistance of the spring and to aid the friction washers in energy absorption; and the springs may be pre-stressed to allow them to operate at loads beyond their original endurance limit.

Due to the variations obtainable by the design and manufacturing process used to make the springs 35, the springs can be tailored to suit the use of the clutch to engines of widely different characteristics. Further, these characteristics increasing the flexibility of the use of the clutch damper assembly have been provided in a structure no larger than prior art devices and therefore usable in the restricted space provided in modern passenger car vehicles.

While a certain preferred embodiment of the invention has been specifically disclosed, it is understood that the invention is not limited thereto, as many variations will be readily apparent to those skilled in the art, and the invention is to be given its broadest possible interpretation within the terms of the following claim.

What is claimed is:

1. In a clutch device; a hub having an integral annular flange projecting radially therefrom; a friction disc supported on said hub on one side of said flange; a drive washer supported on said hub at the other side of said flange; means defining a plurality of aligned groups of apertures in said flange, said friction disc and said drive washer; volute spring means disposed within at least one of said aligned groups of apertures comprising a spring wound with a varying helix angle from material of a rectangular cross-section in such a manner that a frictional contact exists between adjacent coils to increase the resistance of said spring to deflection; said material having residual stresses induced therein to allow deflection of said spring beyond its normal endurance limit; and said volute spring means being adapted to transmit drive from said friction discs to said hub flange and vice versa.

References Cited

UNITED STATES PATENTS

| 2,316,820 | 4/1943 | Thelander | 192—68 |
| 3,101,600 | 8/1963 | Stromberg | 192—68 X |

FOREIGN PATENTS

| 1,342,037 | 9/1963 | France. |
| 293,442 | 3/1914 | Germany. |
| 127,328 | 6/1919 | Great Britain. |
| 382,854 | 11/1932 | Great Britain. |

ROBERT M. WALKER, *Primary Examiner.*

DAVID J. WILLIAMOWSKY, MARK NEWMAN, *Examiners.*

A. T. McKEON, *Assistant Examiner.*